United States Patent
Garrett et al.

[11] Patent Number: 5,643,454
[45] Date of Patent: Jul. 1, 1997

[54] SEWAGE RESPIRATION INHIBITION

[75] Inventors: Michael E. Garrett, Woking; Arthur G. Boon, Stevenage, both of England

[73] Assignee: The BOC Group plc, Windle Sham, England

[21] Appl. No.: 572,272

[22] Filed: Dec. 13, 1995

[30] Foreign Application Priority Data

Dec. 13, 1994 [GB] United Kingdom ............... 9425110

[51] Int. Cl.$^6$ ............................................. C02F 3/02
[52] U.S. Cl. ............................................. 210/620; 210/631
[58] Field of Search ............................. 210/627, 631, 210/620, 610, 754, 756, 760

[56] References Cited

U.S. PATENT DOCUMENTS

| | | | |
|---|---|---|---|
| 3,660,277 | 5/1972 | McWhirter et al. | 210/627 |
| 3,983,031 | 9/1976 | Kirk | 210/627 |
| 4,217,217 | 8/1980 | Kay et al. | 210/220 |
| 4,227,998 | 10/1980 | Reimann | 210/609 |

FOREIGN PATENT DOCUMENTS

| | | |
|---|---|---|
| 0055454 | 12/1981 | European Pat. Off. . |
| 0091015 | 3/1983 | European Pat. Off. . |
| 1432814 | 8/1973 | United Kingdom . |
| 1591104 | 11/1976 | United Kingdom . |
| 2017672 | 4/1979 | United Kingdom . |
| WO82/02193 | 7/1982 | WIPO . |

*Primary Examiner*—Thomas G. Wyse
*Attorney, Agent, or Firm*—R. Hain Swope; Salvatore P. Pace

[57] ABSTRACT

A method is provided for treating sewage by introducing carbon dioxide and oxygen therein so that the carbon dioxide reduces the pH of the sewage to about pH5.0 or below and reduces the activity of bacteria therein such that the oxygen can oxygenate the sewage rather than be consumed by the bacteria. Generation of malodorous compounds is significantly reduced or prevented until the carbon dioxide is sufficiently dispersed so that the pH rises above about 5.0.

7 Claims, 1 Drawing Sheet

SEWAGE RESPIRATION INHIBITION

The present invention relates to a method of reducing the respiration rate of sewage and relates particularly, but not exclusively, to a method of preventing or reducing the septicity of sewage.

BACKGROUND OF THE INVENTION

When sewage is being conveyed to a sewage treatment works or when it is undergoing its initial phase of primary settlement, there may be prolonged periods where it is not in direct contact with air. During such periods, bacteria present will use up the available dissolved oxygen. In the typical sewerage system, these periods can occur when the sewage is at a comparatively high temperature in large gravity sewers where the air surface to volume ratio is low, or in pumped sewers or rising mains.

Sewage that has become anaerobic can form malodorous compounds and generate hydrogen sulfide gas which, when liberated from the sewage, can be oxidized by other bacteria to sulfuric acid of sufficient strength to attack concrete and metal fittings. The presence of a large proportion of septic sewage arriving at a sewage treatment works can also have an inhibitory effect on the bacterial reactions in the sewage treatment plant itself.

To prevent septicity of sewage several methods are employed, for example, the addition of chlorine or sodium hypochlorite to kill some of the bacteria present and inhibit the respiration rate. Similarly, iron salts may be added to fix the sulfide ions present therein as black iron sulfide, or oxygen-containing compounds, such as sodium nitrate, are added as an oxygen source for the facultative bacteria present. These methods are not always effective and have the disadvantage of adding chemicals and sometimes heavy metals to the sewage.

One well known method of treatment to prevent or reduce septicity of sewage involves the use of industrial oxygen. This is added to the sewage in such concentration as will balance the demand caused by the bacterial respiration for the period that the sewage is contained under anaerobic conditions. The method is straightforward and environmentally friendly but has a limitation in that under some conditions, such as high temperatures and/or long retention times, it is impossible to dissolve sufficient oxygen within the sewage liquor. Also, if the gas added exceeds the solubility limit of the sewage, the undissolved gas can adversely affect pipe pumping capacities etc.

The treatment method provided in accordance with the present invention substantially reduces and possibly eliminates the above mentioned problem.

SUMMARY OF THE INVENTION

The present invention provides a method of treating sewage having bacteria contained therein, comprising the step of flushing said sewage with a gas containing carbon dioxide and an oxygen greater than air. The carbon dioxide has the effect of lowering the pH of the sewage, thereby reducing the respiration rate of some of the bacteria. The reduced respiration rate allows the oxygen to effectively oxygenate the sewage rather than being consumed by the bacteria and, hence, prevents the sewage becoming anaerobic and forming malodorous compounds and the like at critical or sensitive points in the sewage transportation or treatment system.

DETAILED DESCRIPTION OF THE PREFERRED EMBODIMENT

Figure 1:
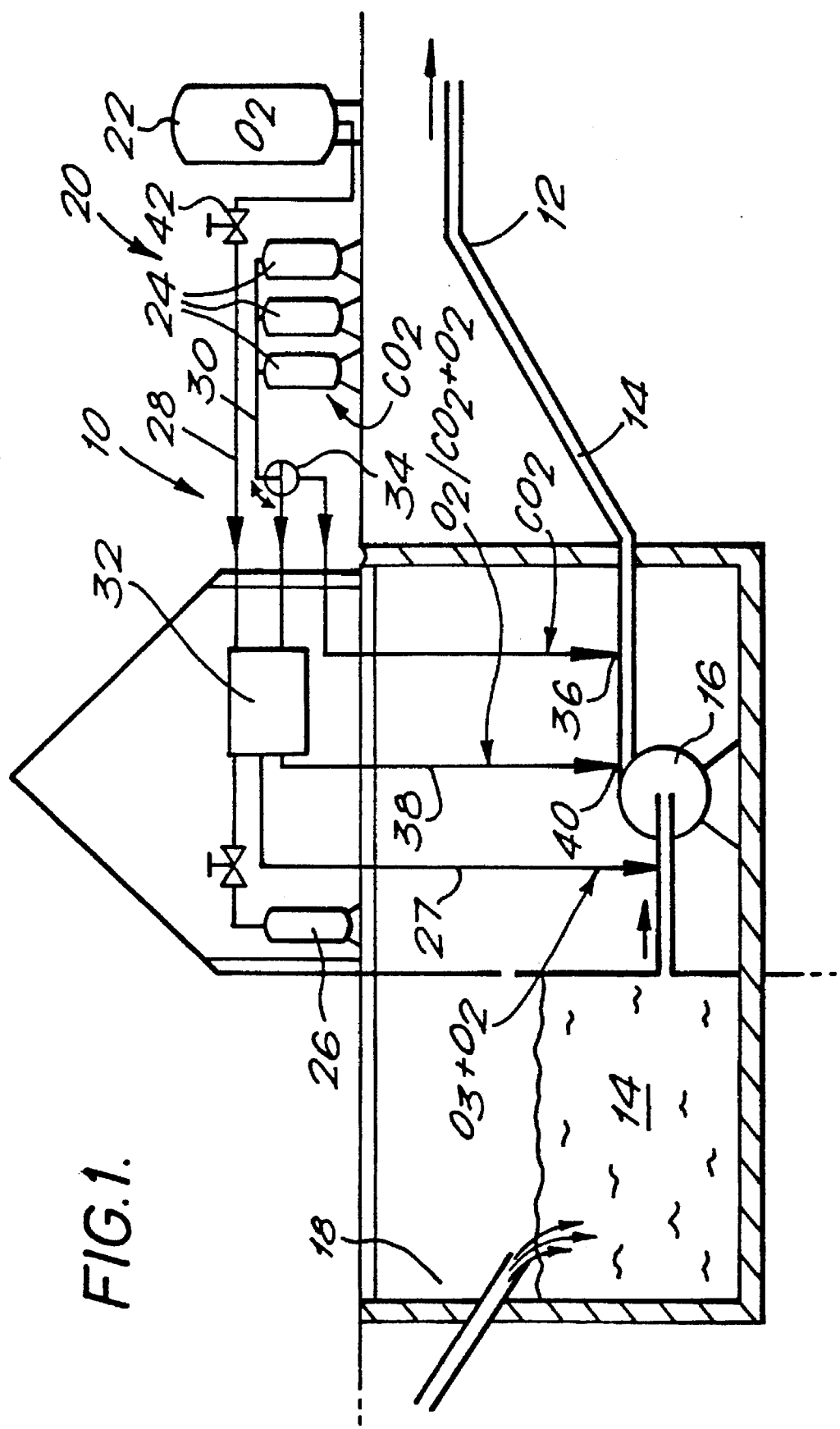
FIG. 1 is a schematic representation of an apparatus for carrying out the present method.

An apparatus illustrating the sewage treatment method of the present invention is shown generally in FIG. 1. The apparatus 10 includes a sewage supply pipe 12 through which sewage 14 is pumped by pump 16 from a tank 18. The flushing apparatus 20 comprises a source of oxygen 22 and carbon dioxide 24. Additional controlling agents which may be utilized in the treatment process such as, for example, ozone, sodium hypochlorite or chlorine may be stored in tank 26 or manufactured on site. Pipes 28 and 30 carry oxygen and carbon dioxide, respectively, to a mixing apparatus 32 the operation of which will be described below. An optional valve 34 may be provided for directing carbon dioxide either to the mixing apparatus 32 or directly to an inlet 36 on sewage pipe 12. Oxygen and/or an oxygen/carbon dioxide mixture is added to pipe 12 via outlet pipe 38 and inlet 40. Carbon dioxide is added to the sewage in sufficient quantities to reduce the pH thereof to about pH5.0 or below. At such pH levels, it has been found that the respiration rate of some of the bacteria present is substantially reduced and, in effect, these bacteria lie semi-dormant until the carbon dioxide disperses and the pH rises above about 5.0. Whilst these bacteria are in a semi-dormant state, they consume little if any of the oxygen dissolved in the sewage. Therefore, the sewage remains aerobic for a longer period thereby temporarily eliminating the formation of anaerobic malodorous compounds including sulfides.

In additional benefit of the lowered pH achieved in accordance with the treatment of the invention is that it enhances the effectiveness of ozone in further reducing the bacterial respiration rate. Conveniently, ozone can be generated from pure oxygen and dissolved in the sewage. Typically, ozone generators work at a lower pressure than that of the pumped sewer. Hence, it may be necessary to add ozonized oxygen, containing up to 15% ozone, on the suction side of pump 16 or via an eductor or compressor (not shown). Line 27 is provided for this purpose. Any unused ozone will revert to oxygen within a few hours.

In operation, sewage 14 is pumped along pipe 12 and carbon dioxide and oxygen and added to the flow thereof via inlets 36 and/or 40. If it is desired to inject only carbon dioxide, the flow of oxygen is prevented by closing valve 42 whilst allowing carbon dioxide to be supplied as before. Obviously, in this arrangement the mixer 32 is redundant unless it is desired to add further controlling agents to the flow of carbon dioxide from tank 26. The oxygen and carbon dioxide may be pre-mixed in mixer 32 and injected co-currently through inlet 40 or may be injected separately, with carbon dioxide being supplied via inlet 36 downstream of oxygen inlet 40. In this latter arrangement, valve 34 is operated so as to direct carbon dioxide directly to inlet 36 rather than through mixer 32. Dissolution of carbon dioxide at a point separated from the point of oxygenation is attractive because of the relative ease of dissolving carbon dioxide compared with oxygen. Treated sewage is pumped away for further treatment in a treatment plant (not shown) as the carbon dioxide slowly disperses and the pH returns to normal. Once the pH rises above about 5.0, the bacterial activity is recommenced. However, by this time the sewage will have passed from the treatment plant and, hence, malodorous compounds and hydrogen sulfide gas are not formed whilst the sewage is at a sensitive point in the treatment process where they will be released to the atmosphere. While it is preferred that an arrangement effecting the treatment method of the invention be situated at a point preceding the sewage treatment plant, it may be situated at any point of the passage of sewage through the sewerage system.

It will be appreciated that the present invention makes use of inhibitory agents which are environmentally acceptable and which will not affect bacterial action further into the treatment process. It will be appreciated by those skilled in the art that the agents are added to the sewage at the point and/or under conditions such that the respiration rate needs to be controlled. The quantity of carbon dioxide added must be sufficient to reduce the pH of the sewage to about pH5.0 or below which inhibits bacterial activity, particularly that of obligate aerobic and facultative bacteria, until such a time as the carbon dioxide disperses and the pH returns to normal.

It is further understood by those skilled in the art that conditions of pH and the like in sewage systems may vary and, therefore, the amount of carbon dioxide to be added to accomplish the desired pH levels will vary accordingly. The means of ascertaining pH, sulfide levels, bacterial content and activity and the like in sewage are considered to be well within the level of skill in the art. The carbon dioxide, whether or not supplemented by ozone, does not necessarily replace the oxygen added, but is supplementary to it and may only need to be used at times of extreme conditions, ie, high summer temperatures or low flowrates.

Carbon dioxide is a natural by-product of respiration by bacteria and in this instance acts as a chemical signal which inhibits bacterial activity. In a normal sewage treatment process, a considerable amount of carbon dioxide is liberated but because of the aeration interface, is lost to the atmosphere without causing the pH to fall to inhibiting levels.

It is preferable that the sewage treated in accordance with the method of the present invention does not contain significant levels of sulfides because the lowering of the pH caused by the addition of carbon dioxide will favor the formation of volatile sulfides and hydrogen sulfide which will be lost to the atmosphere. This will be disadvantageous unless the treatment is carried out when the sewage in moving in a substantially full pipe, or one made of non-corroding material such as glass-reinforced plastic (GRP).

We claim:

1. A method of treating sewage having bacteria contained therein to control the respiration rate of the bacteria as said sewage is being conveyed to a sewage treatment plant or during an initial phase of primary settlement, comprising the step of flushing said sewage with a gas containing carbon dioxide and an oxygen concentration greater than air and an additional controlling agent selected from the group consisting of ozone, chlorine and sodium hypochlorite.

2. A method in accordance with claim 1, wherein said carbon dioxide is provided in quantities sufficient to reduce the pH of the sewage to about 5.0 or below.

3. A method in accordance with claim 1, wherein carbon dioxide is added as a distinct gas stream downstream of the oxygen.

4. A method in accordance with claim 1, wherein the carbon dioxide is added as a distinct gas stream co-currently with the oxygen.

5. A method in accordance with claim 4, wherein the carbon dioxide gas stream and oxygen are mixed together prior to introduction into said sewage.

6. A method in accordance with claim 1, wherein the additional control agent is ozone.

7. A method in accordance with claim 6, wherein the ozone is added to the sewage as ozonized oxygen.

* * * * *